United States Patent

[11] 3,614,603

[72] Inventors Allen N. Martin;
John L. Speas, both of Winston-Salem, N.C.
[21] Appl. No. 861,572
[22] Filed Sept. 29, 1969
[45] Patented Oct. 19, 1971
[73] Assignee Western Electric Company, Incorporated
New York, N.Y.

[54] APPARATUS FOR TESTING SEPARABLE MAGNETIC CORES AT VARYING POSITIONS TO ONE ANOTHER
12 Claims, 17 Drawing Figs.

[52] U.S. Cl. .................................................. 324/34 R, 324/158 F, 209/81 A
[51] Int. Cl. ...................................................... G01r 33/12
[50] Field of Search........................................... 324/34, 34 C, 158 F; 209/81, 81.1, 111.8

[56] References Cited
UNITED STATES PATENTS
1,570,948  1/1926  Crouch........................ 324/34
1,695,679  12/1928  Berlowitz .................... 324/34
FOREIGN PATENTS
868,771  2/1953  Germany...................... 324/34

Primary Examiner—Rudolph V. Rolinec
Assistant Examiner—R. J. Corcoran
Attorneys—W. L. Williamson, W. M. Kain, R. P. Miller and B. I. Levine ABSTRACT: A closable test fixture for paired ferrite cores includes (1) a test coil supported within the fixture and connected to terminals accessible from without the fixture, (2) a spring-loaded pad and (3) a rotatable pad having a shaft accessible from without the fixture. Automatically operated facilities are provided for: (1) loading a pair of ferrite core halves within the fixture in axially spaced relationship on opposite sides of the coil; (2) closing and latching the fixture to assemble the core halves and enclose the test coil therein, holding the core halves together with a predetermined, constant pressure between the two pads; (3) conveying the fixture to successive testing stations where contact is made with the access terminals on the fixture and a driver is actuated to rotate the pad and one core half 360° with respect to the other to produce a range of test results; and (4) conveying the fixture to a vibratory swing nest which is actuable to unlatch and open the fixture to release the core halves into a chute for paired packaging.

| FUNCTION | 0 | 90 | 180 | 270 | 360 |
|---|---|---|---|---|---|
| RELAY 232 | | | | | |
| TRANSFER CYL. 168 | | | | | |
| ROTATOR 196 | | | | | |
| ROTATOR 197 | | | | | |
| ROTATOR 178 | | | | | |
| ROTATOR 192 | | | | | |

APPARATUS FOR TESTING SEPARABLE MAGNETIC CORES AT VARYING POSITIONS TO ONE ANOTHER

BACKGROUND OF THE INVENTION

1. Field of the Invention

The invention relates to an apparatus for testing separable magnetic cores at varying positions to one another and more particularly to an automatic apparatus for handling magnetic cores before, during and after testing thereof.

2. Technical Considerations

Inductor devices and other magnetic circuit components have, for some time, utilized the unique advantages of ferrite materials. Ferrites exhibit several characteristics, such as high relative permeability, high resistivity and low core loss, which are extremely useful in magnetic circuits. Ferrite cores for inductors, for instance, have been utilized extensively in audio and high-frequency equipment, such as telecommunications equipment and the like.

Ferrite cores are molded from mixtures of metallic oxide powders and are usually extremely brittle. Thus, they are highly susceptible to chipping, scratches and other injury when care is not taken in handling them during subsequent operations such as testing and final assembly into circuit components. It has furthermore been found that ferrite dust created by the rubbing together of ferrite cores and from chips and other broken off ferrite particles, is highly abrasive and tends to accelerate wear on various automatic article handling mechanisms such as grippers and conveyors. Aside from the physical damage to ferrite cores arising from excessive handling, it has further been found that mechanical shocks imparted to molded ferrite materials during handling may result in the undesirable alteration of their magnetic characteristics as well.

In one type of ferrite core inductor, ferrite cores in the shape of hollow toroids are separable into two parts, each part constituting one core half. The core halves are assembled and so fitted together as to completely enclose a bobbin wound inductor coil to provide both an axial magnetic path through the center of the coil and a coaxial magnetic path external to the coil. The testing of the magnetic characteristics of a magnetic core for the foregoing inductor comprises the testing of paired core halves as a unit. It is therefore necessary, in order to test paired magnetic core halves, to: (1) assemble the core halves over a test coil, holding the core halves assembled with a predetermined, constant, contact pressure; (2) provide an electrical connection between the enclosed test coil and the test equipment; (3) rotate the cores relative to each other about their common axis to obtain a range of test results arising from the changed relative rotational positioning of the core halves; and (4) disassemble the core halves after the test results are obtained.

If several tests are to be carried out on these magnetic cores, the above steps must be repeated for each test. Manual execution of these procedures for large numbers of mass produced magnetic cores is costly both from the standpoint of the time consumed as well as the risk of injury to the magnetic cores involved in successively assembling and disassembling the cores.

It would be an advantage to avoid successive assembling and disassembling of paired ferrite cores where multiple tests are to be performed thereon in order to reduce the risk of injury to the cores due to excessive handling subsequent to fabrication.

It would be a further advantage to provide an apparatus which could facilitate the automatic performance of a series of tests on paired magnetic cores by reducing the assembly and disassembly operations on each core to a single instance each such that a core may be assembled, completely tested and disassembled.

SUMMARY OF THE INVENTION

An object of the present invention is to provide new and improved apparatus for facilitating testing of magnetic cores by minimizing handling of the cores before, during and after testing thereof.

Another object of the present invention is to provide new and improved apparatus for facilitating multiple testing of magnetic core halves as a unit by assembling the core halves in operative relation to a test facility and transporting the assembled core halves and the test facility to successive testing stations where test connections may be made to the test facility.

An additional object of the present invention is to provide a new and improved test fixture for receiving and supporting the separable halves of a magnetic core in operative relation with a test coil supported within the fixture and being accessible from without the fixture.

A further object of the present invention is to provide a transportable test fixture for magnetic cores which fixture is adapted to receive and provide testing access to magnetic cores and to protect the received cores from mechanical shock during testing thereof.

A still further object of the present invention is to provide a new and improved apparatus for facilitating testing of magnetic cores including a test fixture which may be automatically loaded with magnetic cores and thereafter conveyed to successive test stations where the cores may be adjusted relative to each other during testing thereof and subsequently unloaded.

With these and other objects in view, the present invention contemplates a new and improved test apparatus for separable magnetic cores including a portable test fixture for receiving the separable parts of the cores for operative association of the core parts with a test facility supported within the fixture and accessible from without the fixture, together with an instrumentality for varying the operative association of the separable parts of the core to render available a range of test results.

The test facility is a standard test coil supported within the fixture. Paired ferrite core halves are retained within the fixture in an assembled condition with a predetermined, constant pressure. Loading of the fixture is automatic and the loaded fixture is thereafter transported on a conveyor to: (1) a closing station at which an automatically operated closure operator closes and locks the fixture; (2) one or more test stations at which test connections are made to the coil and an adjusting member is actuated to rotate one core half with respect to the other in order to produce a range of test results; and (3) an unloading station where the fixture is conveyed into a swing nest which is actuated to unlock and open the fixture to release the tested core halves into a chute for packaging or the like.

BRIEF DESCRIPTION OF THE DRAWINGS

A comprehensive understanding of the invention will be obtained by considering the following several views of the drawings in conjunction with the detailed description, wherein.

DETAILED DESCRIPTION

Figures 1, 2, 3:
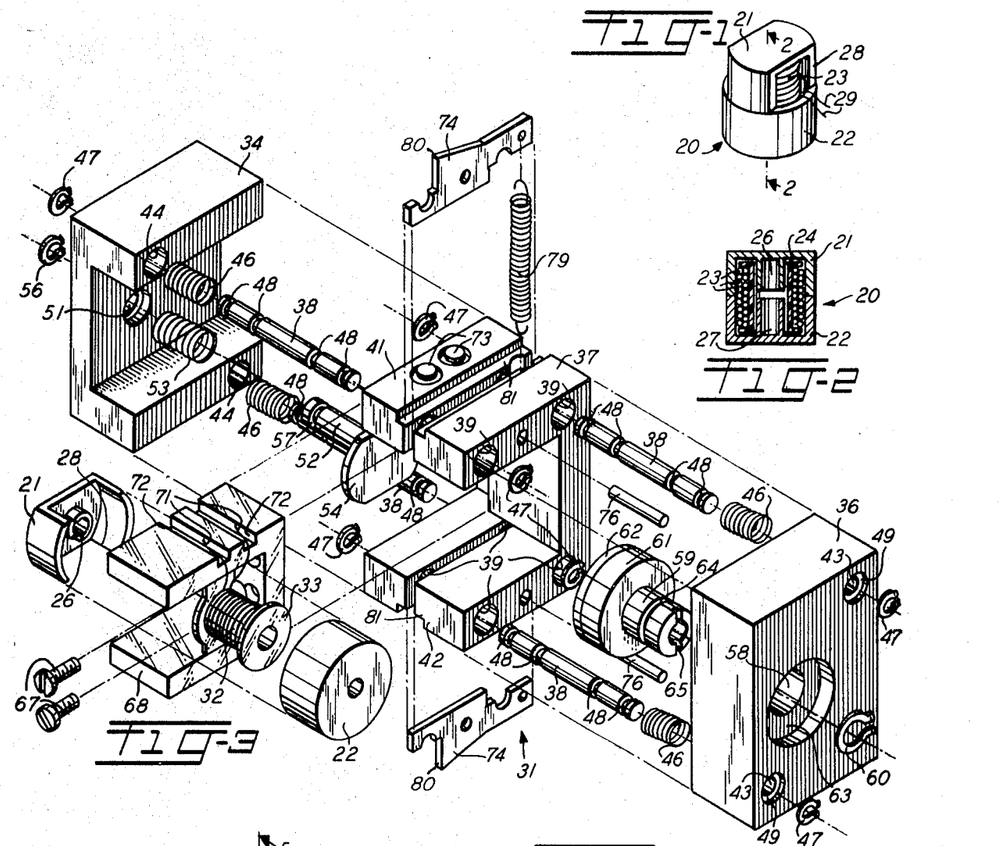
FIG. 1 shows a ferrite core inductor comprising two cup-shaped ferrite core halves assembled to enclose a bobbin-wound inductor coil.
FIG. 2 is a sectional view of the ferrite core inductor taken along the line 2—2 of FIG. 1.
FIG. 3 is an exploded view of the test fixture of the invention for facilitating testing of paired cup-shaped ferrite cores.

Referring to FIGS. 1 and 2, there is shown an inductor device 20 including a magnetic core comprising a pair of cup-shaped ferrite core halves 21 and 22 which are assembled to enclose an inductor coil 23 wound on a bobbin 24. Each of the core halves 21 and 22 is formed with internal cylindrical projections 26 and 27, respectively, which, when the core halves are assembled, extend from opposite sides through the center of the bobbin 24 to form a magnetic path coaxial with the coil 23. The core half 21 is truncated at its extremities forming windows or apertures 28—28 on opposite sides thereof to permit a pair of leads 29—29 from the coil 23 to be connected to an external circuit.

Figure 4:
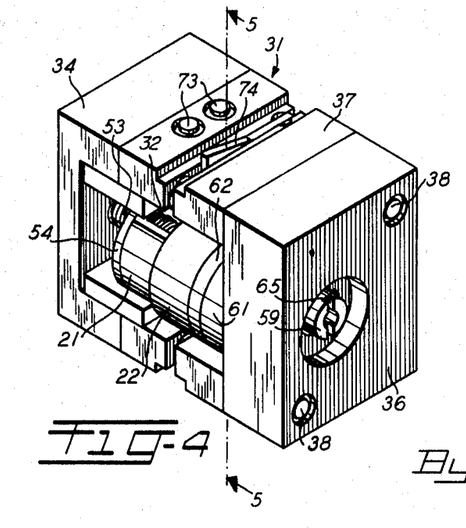
FIG. 4 is a perspective view of the test fixture of FIG. 3 after it has been loaded with paired ferrite cores, closed and latched.

FIGS. 3 and 4 shown a test fixture 31 for holding together two ferrite cup-shaped core halves 21 and 22 with a predetermined, constant pressure over a test coil 32 wound on a bobbin 33 while the fixture is conveyed through various testing stations. While the contact pressure between the core halves is maintained, one core half may be rotated 360° with respect to the other within the fixture 31 to produce a range of results during testing.

The fixture 31 includes a U-shaped end plate 34 and a rectangular end plate 36 both of which are slidably mounted for movement toward and away from a central block 37 on four parallel guide rods 38—38. The guide rods 38—38 extend through eight apertures 39—39 formed in a pair of oppositely disposed bifurcated arms 41 and 42 on the central block 37. Two of the guide rods 38—38 extend from diagonally opposite apertures 39—39 through a pair of aligned apertures 43—43 in end plate 36. Similarly, the remaining two guide rods 38—38 extend from diagonally disposed apertures 39—39 through a pair of aligned apertures 44—44 in end plate 34.

The end plates 34 and 36 are normally urged away from the central block 37 by four helical compression springs 46—46 each surrounding one guide rod 38. Movement of the end plates 34 and 36 away from central block 37 is limited by snap rings 47—47 which engage outer ones of four spaced grooves 48—48 in each of the guide rods 38—38 and the offset portions 49—49 of counterbores or the like which may be formed around the various aligned apertures.

The end plate 34 has formed therein a counterbored opening 51 for receiving a stub shaft 52 surrounded by a compression spring 53 and attached to a truncated circular retaining pad 54. The shaft 52 and the pad 54 attached thereto are retained within the opening 51 against the action of spring 53 by snapring 56 which engages the offset portion of opening 51 and a groove 57 formed in the shaft 52. The spring 53 is calibrated to urge the pad 54 toward the opening between the arms 41 and 42 of the central block 37 with a predetermined force.

The end plate 36 is formed with a counterbored opening 58 for receiving a bored shaft 59 connected to a similarly bored rotatable pad 61 which has adhesively secured thereto a resilient annulus 62 made of rubber or the like. The shaft 59 is rotatably retained in the opening 58 by a snapring 60 which engages an offset 63 formed in the counterbored opening 58 and a groove 64 formed in the shaft 59. The end of shaft 59 is formed with a slot 65 to receive a rotatable adjusting member 66 (FIGS. 6 and 7) which may be driven to rotate the pad 61. The pads 54 and 61 are axially aligned with one another within the space defined by the arms 41 and 42 of the central block 37.

Secured to the rear wall of the block 37 by a pair of screws 67—67 is a U-shaped bobbin support 68 attached to which is the bobbin or spool 33 upon which is wound the test coil 32. The support 68 and the bobbin 33 may be a unitary structure fabricated from nylon or the like. A pair of test leads 71—71 from the coil 32 are retained within a pair of lateral grooves 72—72 formed in the bobbin support 68 and are connected to a pair of access terminals 73—73 supported within the arm 41 of the block 37. The core halves 21 and 22 may be assembled over the bobbin 33 to completely enclose the test coil 32 in the same manner as shown in FIG. 2 where the cores 21 and 22 enclose inductor coil 23 wound on bobbin 24.

Figure 5:
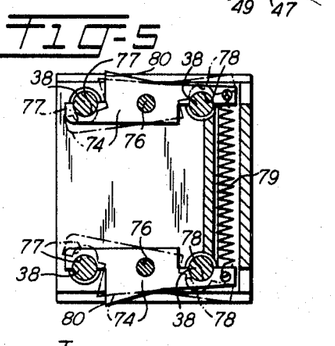
FIG. 5 is a sectional view of the closed test fixture, taken along the line 5—5 of FIG. 4, showing the latches for retaining the test fixture closed and a phantom line representation of the operative positions of the fixture latches for opening the fixture.
Figure 7:
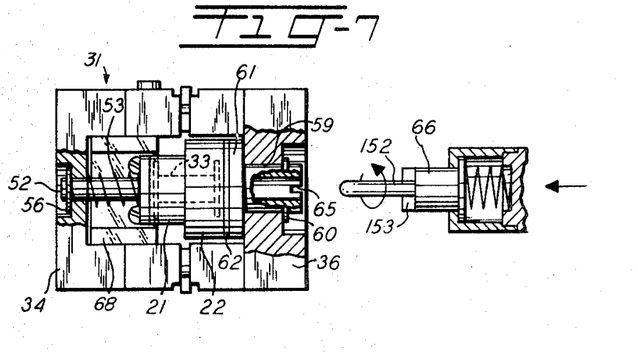
FIG. 7 is a front view of the test fixture of FIG. 4, partly in section, also showing the positioning of a core adjusting member for rotating one core half in the fixture 360° with respect to the other.

The spaces between the bifurcations of the arms 41 and 42 of central block 37 are adapted to receive a pair of latches 74—74 which are pivotally mounted on pivot pins 76—76 which extend across the bifurcations of arms 41 and 42. As seen more clearly in FIG. 5 each latch 74 is formed with two semicircular cutout portions 77 and 78 which are normally urged into the inner spaced grooves 48—48 in opposite pairs of guide rods 38—38 by the force provided by a tension spring 79 when the fixture 31 is closed as shown in FIGS. 4 and 7. The tension spring 79 connects the latches 74—74 to each other and retains the fixture 31 in its closed position until a projecting portion 80 on each latch 74 is depressed to pivot the latch 74 about pin 76 against the force of spring 79. Depression of projections 80—80 moves the semicircular cutouts 77—77 and 78—78 out of engagement with grooves 48—48 in rods 38—38 to permit the springs 46—46 to move the end plates 34 and 36 away from central block 37. The bifurcated arms 41 and 42 are formed with centrally extending slots 81—81 into which an unlatching member may be moved to depress projections 80—80. The slots 81—81 also serve to protect the fixture from being unlatched by its own weight while resting on a flat surface since the projections 80—80 do not, by virtue thereof, extend outward of the fixture 31.

The fixture 31 may be loaded with a ferrite core pair 21 and 22 by unlatching the latches 74—74 to permit springs 46—46 to urge the end plates 34 and 36 away from the central block 37. The flat sided core half 21 may then be inserted between the arms of a U-shaped bobbin support 68, the projection 26 of core half 21 then being aligned with the axis of bobbin 33 while the outer walls of the core half 21 extend over the bobbin 33. The circular core half 22 may then be inserted between rotatable pad 61 and the bobbin 33 to align the projection 27 of core half 22 with the axis of bobbin 33 and the projection 26 of inserted core half 21. The outer wall of core half 22 will thus extend over the bobbin 33. The fixture 31 may then be closed by moving the end plates 34 and 36 toward the central block 37 against the urging of springs 46—46 until the semicircular cutouts 77—77 and 78—78 of latches 74—74 engage the grooves 48—48 of guide rods 38—38 to lock the fixture closed. It is seen that once the fixture 31 is closed it is self-latching.

When the fixture 31 is closed and latched, the core halves 21 and 22 completely enclose and capture the bobbin 33 and the test coil 32 wound therearound. The core halves 21 and 22 are held together with a constant pressure exerted by the calibrated spring 53 against core halves 21 and 22 and pad 61. This pressure is independent of the forces exerted against end plates 34 and 36 by the springs 46—46 while the fixture 31 is closed. If the shaft 59 is rotated, while the fixture 31 is closed, the frictional forces between the resilient annulus 62 and the core half 22 will then act to rotate core half 22 with respect to core half 21 since the core half 21 will be prevented from rotating by the bobbin support 68. Test connections may be made to the contact terminals 73—73 in arm 41 of central block 37. The construction of the fixture 31 is such that the core halves 21 and 22 are centered and aligned with each other upon their insertion into the fixture.

Since magnetic core tests are frequently carried out on a mass basis, facilities have been provided for automatically loading, closing, adjusting and unloading the fixture 31 during testing of the core halves 21 and 22 therein.

Figure 6:
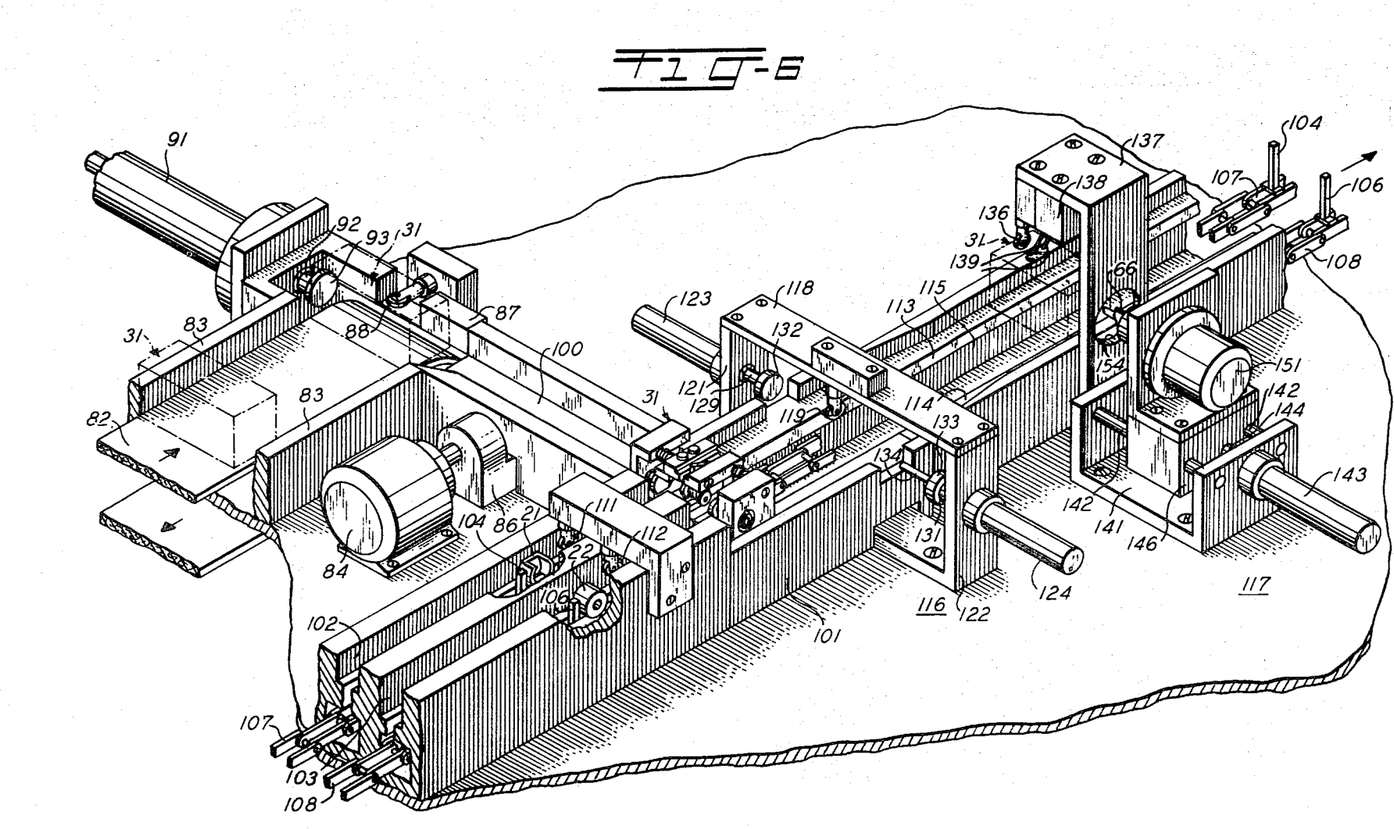
FIG. 6 is a perspective view of a loading station for loading paired ferrite cores into the test fixture of FIG. 1, a closing station for closing and latching the loaded fixture and a testing and adjusting station for making test contact with and imparting relative rotation to the ferrite cores within the fixture, together with apparatus for conveying empty fixtures to the loading station and for conveying the loaded fixtures to the closing station and testing station.

FIG. 6 shows an apparatus for (1) conveying a test fixture to a loading position, (2) loading the fixture with paired ferrite cores, (3) closing the fixture and (4) making test contact with the test coil in the fixture while rotating the circular core half 22 360° with respect to the flat-sided core half 21.

Figure 8:
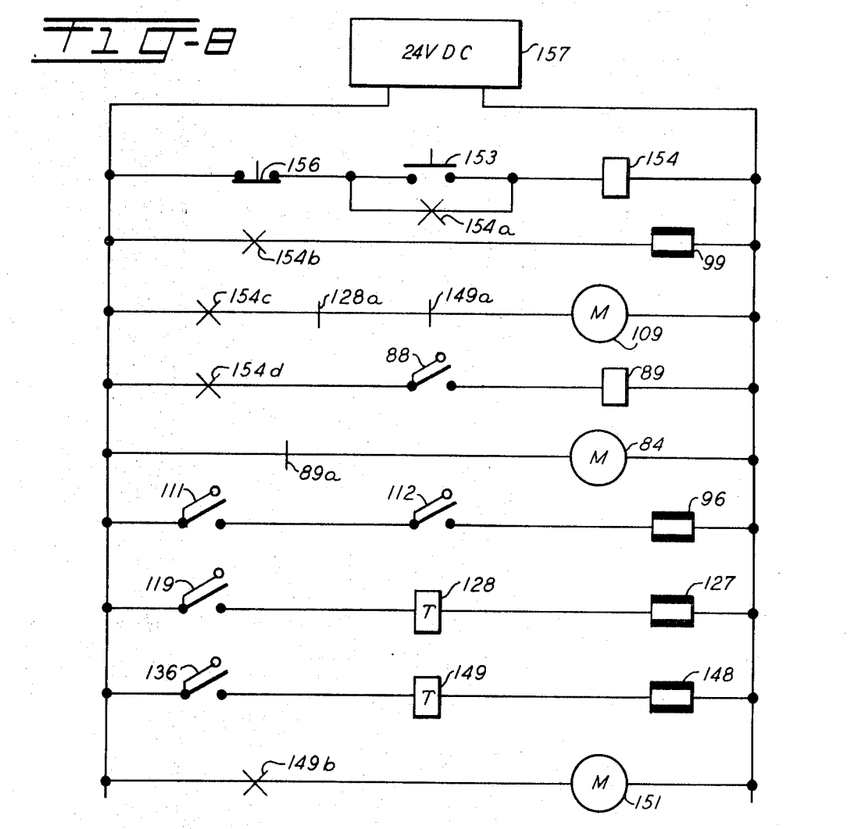
FIG. 8 is a schematic diagram of the electrical circuit for controlling the operation of the loading, closing and adjusting apparatus of FIG. 6.

A fixture carrying conveyor belt 82, in a guideway defined by a pair of end plates 83—83, is driven by a motor 84 through a gear box 86. The belt 82 is reversed just short of a guide wall 87 which houses a microswitch 88. As shown in FIG. 8, the microswitch 88 is normally open and is in series with a relay 89.

Adjacent to the guide wall 87 is an air cylinder 91 having a piston 92 on the end of which is a pusher pad 93 for engaging a fixture 31 on the conveyor 82 and in contact with microswitch 88. The air cylinder 91 is controlled by a valve 94 (FIG. 9) actuated by a solenoid 96 to feed air from an air supply 97 through a valve 98 actuated by a solenoid 99. The air cylinder 91 may be operated to push an open fixture 31 along the wall 87 into a trackway 100 until the fixture abuts a wall 101 to align the fixture 31 with a pair of loading trackways 102 and 103.

The trackways 102 and 103 are adapted to receive core halves 21 and 22, respectively, which may be loaded thereon and moved therealong by a pair of fingers 104 and 106 on a pair of conveyor chains 107 and 108, respectively, driven by a motor 109 (FIG. 8). A pair of normally open microswitches 111 and 112, disposed above the trackways 102 and 103, respectively, are positioned to be actuated by core halves 21 and 22 as they are moved. As seen in FIG. 8, microswitches 111 and 112 are connected in series with solenoid 96.

The chains 107 and 108 extend beneath slots 113 and 114 in a fixture trackway 115 aligned with trackways 102 and 103. The trackway 115 extends through a fixture closing station 116 and a testing and core adjusting station 117.

The fixture closing station 116 includes a horizontal supporting member 118 to which is fixed a fixture detecting microswitch 119. The horizontal support member 118 is supported at either end by a pair of support plates 121 and 122 which also support two fixture-closing air cylinders 123 and 124, respectively. The air cylinders 123 and 124 are connected to be operated simultaneously through a valve 126 (FIG. 9) under the control of a solenoid 127. As shown in FIG. 8, the fixture-detecting microswitch 119 and the solenoid 127 are connected in series with a timed relay 128. When air cylinders 123 and 124 are operated, they move respective pistons 129 and 131 toward each other. If an open fixture 31 is on the trackway 115 between the support plates 121 and 122, pads 132 and 133 on pistons 129 and 131, respectively, will act to close and latch the fixture 31. A centering rod 134 on pad 133 is adapted to enter the fixture 31 through the bore in shaft 59 to insure centering of the loaded cores 21 and 22.

The testing and adjusting station 117 includes a normally open microswitch 136 which may be closed by a moving closed fixture on the trackway 115, which may be narrowed in the vicinity of station 117 to guide fixture 31 therein. An L-shaped support member 137 supports a contact box 138 from which protrudes a pair of test contacts 139—139 adapted to make a test connection to the access terminals 73—73 on the fixture 31 in order to perform one or more tests on the cores 21 and 22 in the fixture 31. A guide rod support 141 supports a pair of guide rods 142—142 and an air cylinder 143 having a piston 144 connected to a motor support 146, slidably mounted on guide rods 142—142. The air cylinder 143 is operated through a valve 147 (FIG. 9) actuated by a solenoid 148, in series with the microswitch 136 (FIG. 8) and a relay 149, to move the motor support 146 and a drive motor 151 mounted thereon toward the fixture 31 on the trackway 115 at station 117. The motor 151 may be actuated to rotate the driving member 66 as the motor 151 moves toward the fixture 31 until a rod 152 (FIG. 7) on the driving member 66 enters the bore in shaft 59 on the fixture 31 to guide a head 153 and driving member 66 into the slot 65 formed in shaft 59 (FIG. 7). As shown in FIG. 7, the core half 22 may then be rotated with respect to the core half 21 while the test is being conducted thereon to vary the magnetic characteristics thereof in order to obtain a range of test results.

Figure 9:
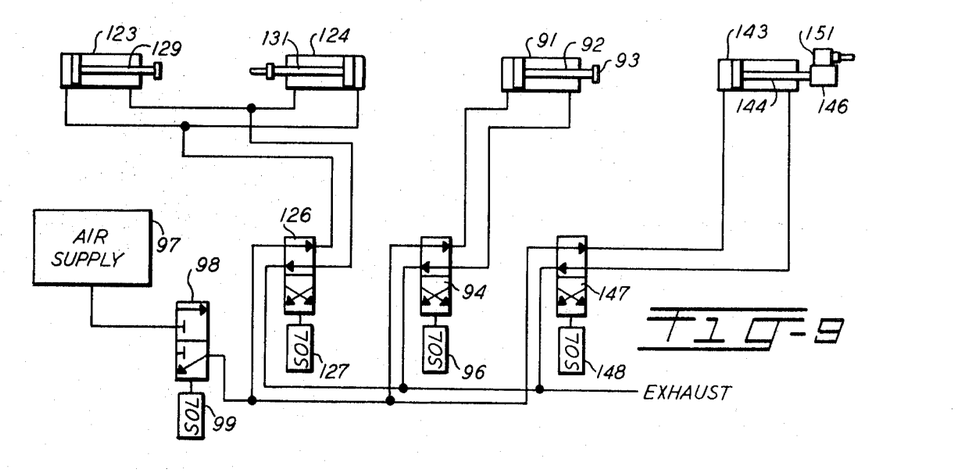
FIG. 9 is a schematic diagram of the pneumatic system for operating the loading, closing and adjusting apparatus of FIG. 6.

The sequence of operation of the various parts of the loading, closing and adjusting apparatus of FIG. 6 can best be understood by referring to the electrical circuit diagram of FIG. 8, considered in conjunction with the pneumatic diagram of FIG. 9. In the circuit diagram relay contacts are represented by detached contacts, crosses ("X"'s) indicating "make" or normally open contacts and bars ("I"'s) indicating "break" or normally closed contacts. The contact pair associated with a designated relay is numbered the same as the relay with a lower case letter following the number to indicate a particular contact pair.

The operation of the loading, closing and adjusting apparatus is as follows. A pair of ferrite core halves 21 and 22 are placed in trackways 102 and 103, respectively, either by an operator or by an automatic feeding apparatus which may be a modification of the automatic apparatus disclosed in application Ser. No. 862,235 entitled "Apparatus For Assembling Pieceparts Into Cup-Shaped Adapters," filed Sept. 30, 1969 in the name of E. H. Craver and assigned to the assignee of the present invention. One or more open fixtures 31 may be placed on the conveyor belt 82 with its access terminals 73—73 upward and its end plate 36 facing the trackways 102 and 103. The operator may then close a start switch 153 to energize a relay 154 through a normally closed stop switch 156 from a source 157 which supplies 24 V DC to the system. Energization of relay 154 closes contacts 154a through 154d. Closure of contacts 154a holds relay 154 energized while closure of contacts 154b energizes solenoid 99 which actuates valve 98 to supply air from air supply 97 to the pneumatic system of FIG. 9. Closure of contacts 154c energizes the chain drive motor 109 through normally closed contacts 128a and 149a of relays 128 and 149, respectively. Closure of contacts 154d sets up relay 89 which will then be energized upon closure of microswitch 88.

Conveyor motor 84 is energized through normally closed contacts 89a of relay 89 to move a fixture 31 into contact with microswitch 88 in guide wall 87 (FIG. 6). When microswitch 88 is closed, relay 89 is energized to open contact 89a and stop the conveyor belt drive motor 84 to stop the conveyor belt 82 with a fixture 31 in line with piston 92 of air cylinder 91.

As the core halves 21 and 22 are moved along trackways 102 and 103 by fingers 104 and 106 on driven chains 107 and 108, they close normally open microswitches 111 and 112 over trackways 102 and 103 to energize solenoid 96. The energization of solenoid 96 actuates valve 94 which operates air cylinder 91 to move piston 92 and pusher pad 93 to push a fixture 31 into alignment with trackways 102 and 103 to receive the cores 21 and 22 therefrom.

The fingers 104 and 106 push the cores 21 and 22 into the aligned fixture 31 and continue moving to carry the fixture along trackway 115 to the closing station 116. As the fixture 31 is moved off the belt by the pusher pad 93 on piston 92, microswitch 88 is opened to deenergize relay 89 which may be timed to allow contacts 89a to close and restart conveyor motor 84 after providing sufficient time for the piston 92 to retract back into the air cylinder 91 when solenoid 96 is deenergized upon the opening of microswitches 111 and 112 when core halves 21 and 22 have passed therefrom on trackways 102 and 103.

As the fixture 31 approaches the closing station 116, microswitch 119 is closed to energize relay 128 and solenoid 127. Energization of relay 128 opens normally closed contacts 128a to stop chain drive motor 109 to stop the fixture 31 on the trackway 115 at the closing station 116. Energization of solenoid 127 actuates valve 126 to operate air cylinders 123 and 124 to move pistons 129 and 131 toward the center of trackway 115 whereupon pusher pads 132 and 133 act to close and latch the fixture 31 to capture the bobbin 33 and coil 32 wound therearound centering rod 134 on the pad 133 enters the fixture 31 through the base in shaft 59 to assure centering of the core halves 21 and 22 along the axis of coil 32. The relay 128 is timed to reclose contacts 128a after a predetermined interval to restart the chain drive motor 109 and to deenergize solenoid 127 to retract pistons 129 and 131 of air cylinders 123 and 124, respectively.

When the chain drive motor 109 is started again, the now closed fixture 31 is carried further along trackway 115 to testing and adjusting station 117. As the fixture 31 approaches the station 117, microswitch 136 is closed to energize relay 149 and solenoid 148. Energization of relay 149 opens contacts 149a for a predetermined time to stop the chain drive motor 109 to stop the fixture 31 at station 117. At this time, testing access to coil 32 is accomplished through contacts 139—139 and access terminals 73—73 of fixture 31. At the same time, contacts 149b of timed relay 149 close to energize the motor 151 to rotate core adjusting member 66.

Energization of solenoid 148 actuates valve 147 to operated piston 143 to slide motor support 146 and motor 151 thereon toward the fixture 31. The adjusting member 66 is passed through an aperture 154 on the support 137 and the guide rod 152 enters the bored shaft 59 (FIG. 7) to guide the head 153 into the slot 65 formed in shaft 59 to rotate the shaft 59 and thus rotate core half 22 to obtain a range of test results. The adjusting member 66 may be spring-loaded as shown in FIG. 7 to assure that head 153 enters the slotted shaft 59. When the solenoid 148 deenergizes, the valve 147 operates the air cylinder 143 to retract the motor support 146. At this time, contacts of timed relay 149 close to start chain drive motor 109 to carry the closed fixture to subsequent testing stations which may be similar to station 117.

After testing of the core halves has been completed, the fixture is transferred to an unloading station where it is unlatched, opened and the cores emptied into a chute for packaging or the like.

Referring to FIGS. 10, 11, 11A, 11B and 12, an unloader 156 includes an input track 157, a transfer track 158, a swing nest 159 and a discharge chute 161. The input track 157 includes a pair of side rails 162—162 for guiding a test fixture 31 arriving from a final testing station. The fixture 31 may be conveyed onto the input track 157 by a chain conveyor similar to the chains 107 and 108 or it may be pushed therein by a pusher arm or track 157 may be inclined to gravity-feed the fixture toward the transfer track 158. A microswitch 163 is disposed in the track 157 such that it will be closed when it is contacted by a moving fixture 31 in the track 157.

Figure 10:
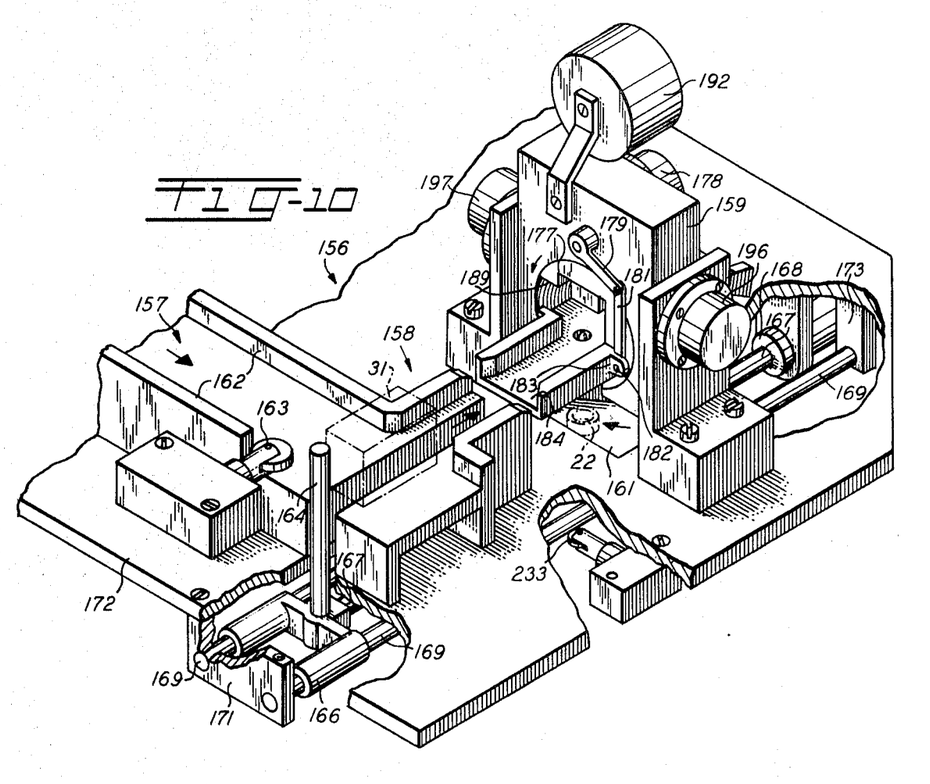
FIG. 10 is a perspective view of an apparatus for unloading the test fixture after testing has been completed.

The transfer track 158 is slotted to receive a transfer pin 164 mounted on a slide 166 connected to a piston 167 in an air cylinder 168. The slide 166 moves along a pair of guide rods 169—169 supported at one end on a plate 171 secured to a base frame 172 and at the other end in a pair of support brackets 173—173 also secured to frame 172.

Figure 14:
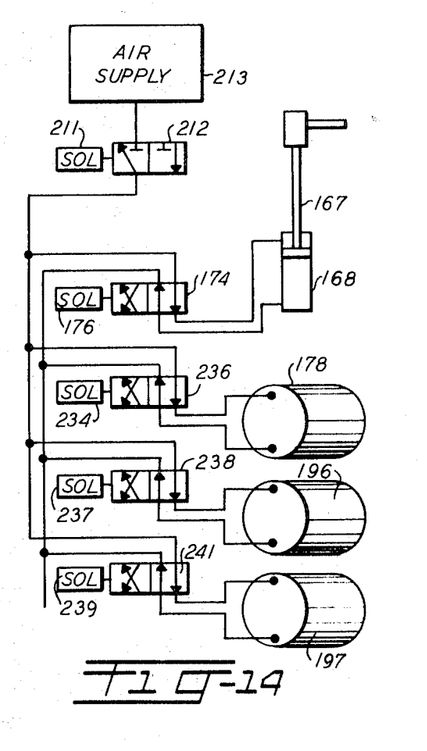
FIG. 14 is a schematic diagram of the pneumatic system for operating the unloading apparatus of FIGS. 10 and 11.

The air cylinder 168 is operated through a valve 174 controlled by a solenoid 176 (FIG. 14). The air cylinder 168 may be operated to move the piston 167 and the slide 166 to bring the transfer pin 164 into engagement with a closed fixture 31 on transfer track 158 to move the fixture 31 along track 158 into a rotatable receiver 177 in swing nest 159. The receiver 177 may be rotated in the direction of the arrow shown in FIG. 10 by an air-operated 90° rotator 178 through a rotatable arm 179 and a link 181 connected by a pin 182 to a projection 183 on a guideway 184 extending from receiver 177.

If the fixture 31 is loaded into receiver 177 with the access terminals 73—73 upward and end plate 34 leading, the latches 74—74 will be aligned with a pair of spring-loaded unlatching members 186—186 (FIG. 11) having camming ends 187—187 adapted to ride in a cam trackway 188 formed within the swing nest 159. When the arm 179 is rotated 90° in the direction shown in FIG. 11, an opening 189 in receiver 177 will be aligned with a passageway 191 in the swing nest 159 disposed above the discharge chute 161. As the receiver 177 is rotated, the unlatching members 186—186 will be cammed by the trackway 188 into engagement with latches 74—74 to spring the fixture 31 open to free the core halves 21 and 22 so that they will pass out of the fixture 31 through opening 189 and passageway 191 into the discharge chute 161.

To insure unloading of the core halves 21 and 22 from the fixture 31, means are provided for applying vibrations to the swing nest 159 and for tilting the swing nest 45° in two opposite directions with respect to the horizontal plane of the frame base 172 to free any core half which may be hung up on bobbin 33 or otherwise remaining in the fixture 31.

A vibrator 192, driven by a vibrator control 193 (FIG. 13), is mechanically connected to swing nest 159 through a bracket 194. The vibrator 192 aids in freeing the core halves 21 and 22 from the now open fixture 31. A pair of air-operated rotators 196 and 197 may be operated in sequence to rotate the nest 159 first counterclockwise until it reaches a 45° angle with respect to the horizontal direction, and then 90° counterclockwise with respect to FIGS. 10 and 12 until it reaches a 45° angle with respect to the horizontal plane of base 172 thus insuring the freeing of the cores from the fixture 31 and the releasing of them into the discharge chute 161.

Figures 11, 11A, 11B:
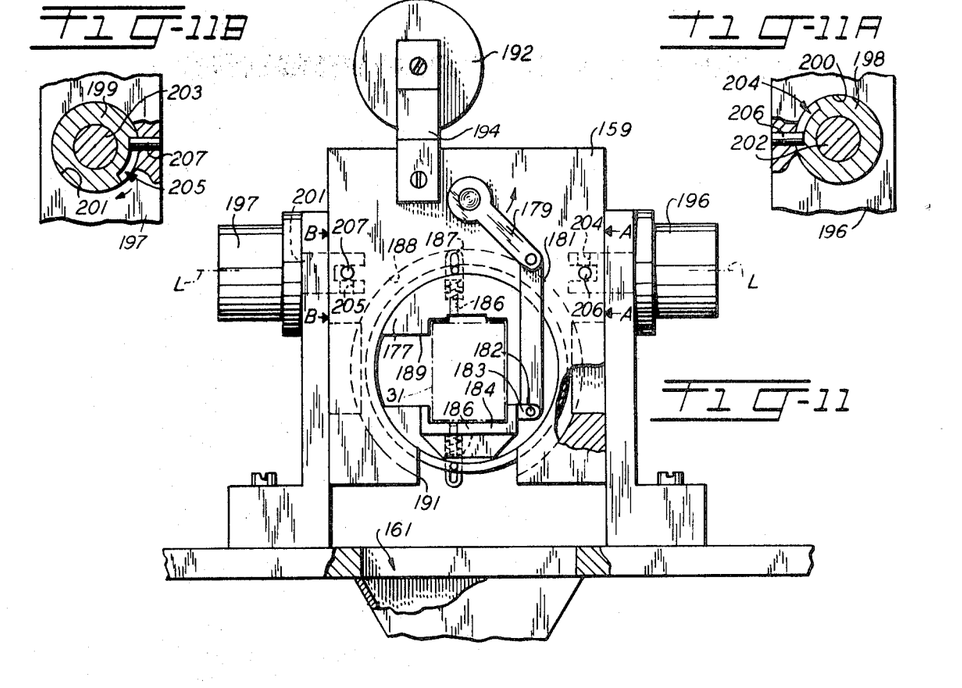
FIG. 11 is a front elevational view, partly in section, of an unloading nest for receiving and unlatching the test fixture to separate the magnetic cores therefrom.
FIG. 11A is a enlarged sectional view, taken along the line A—A of FIG. 11, showing an air rotator shaft, having a cam slot formed therein for cooperating with a pin and stud in the unloader nest in order to impart an initial 45° counterclockwise rotation thereto in order to aid in freeing the magnetic cores from the fixture.
FIG. 11B is a enlarged sectional view, similar to FIG. 11A and taken along the line B—B of FIG. 11, showing a second shaft, pin and stud arrangement for imparting successive 90° clockwise and 45° counterclockwise rotational movements to the unloader nest, to further aid in freeing the cores and return the unloader nest to its original position.

The air-operated rotators 178, 196 and 197 may be identical devices of the well-known type wherein the introduction of air into the rotator causes a rotatable shaft thereon to rotate 90° in a given direction. As shown in FIGS. 11A and 11B, the air rotators 196 and 197 include hollow output shafts 198 and 199, respectively, adapted for insertion into a pair of cylindrical hollows 200 and 201, respectively, in swing nest 159 over a pair of studs 202 and 203 formed within hollows 200 and 201, respectively. The ends of shafts 198 and 199 are formed with cam slots 204 and 205, respectively, which extend 45° circumferentially around each shaft 198 and 199. A pair of pins 206 and 207 inserted within the swing nest 159 ride in the slots 204 and 205 and act to pivot the swing nest about an axis L—L through the studs 202 and 203 when pins 206 and 207 are engaged by the positively driven rotator shafts 198 and 199, respectively.

Figure 12:
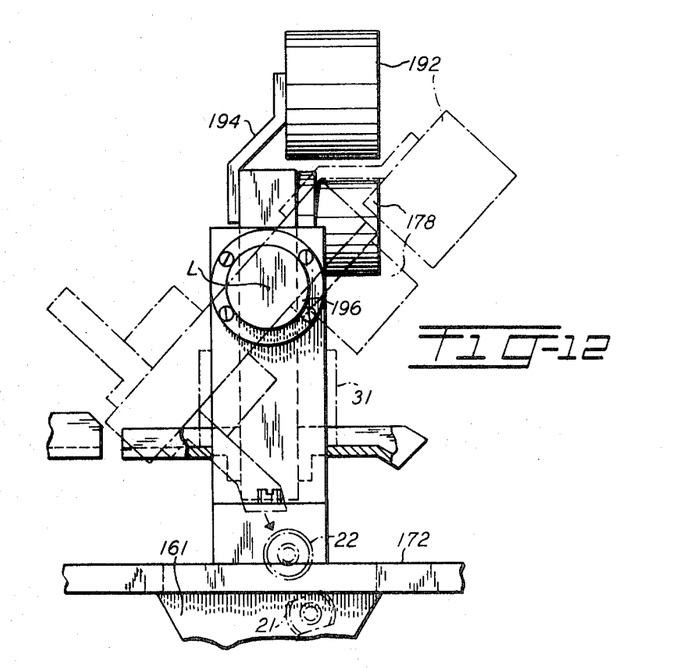
FIG. 12 is a side elevational view of the unloading nest of FIG. 10 showing a phantom representation of the nest tilted to dump the unloaded cores from the test fixture in the nest into a discharge chute.
Figure 13:
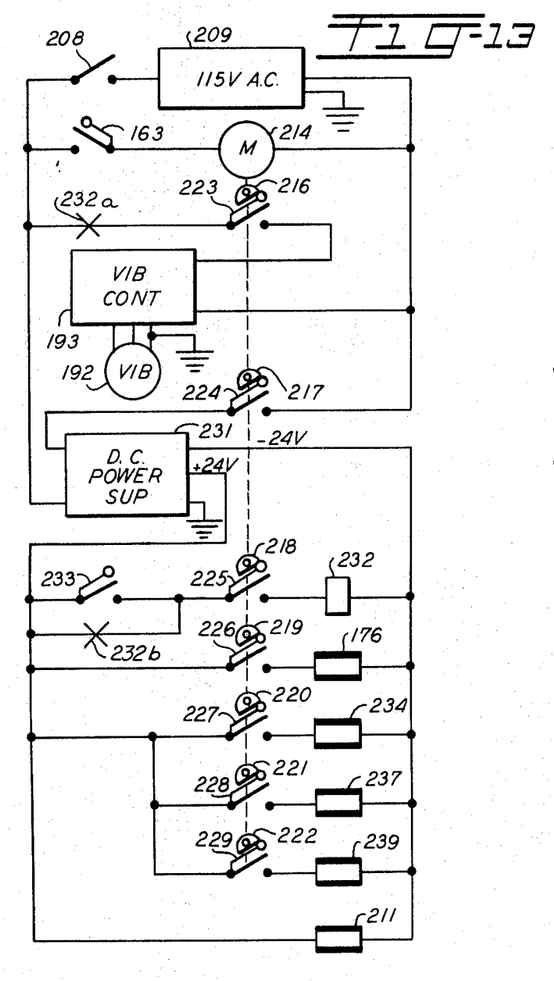
FIG. 13 is a schematic diagram of the electrical circuit for controlling the operation of the unloading apparatus of FIGS. 10 and 11.
Figure 15:
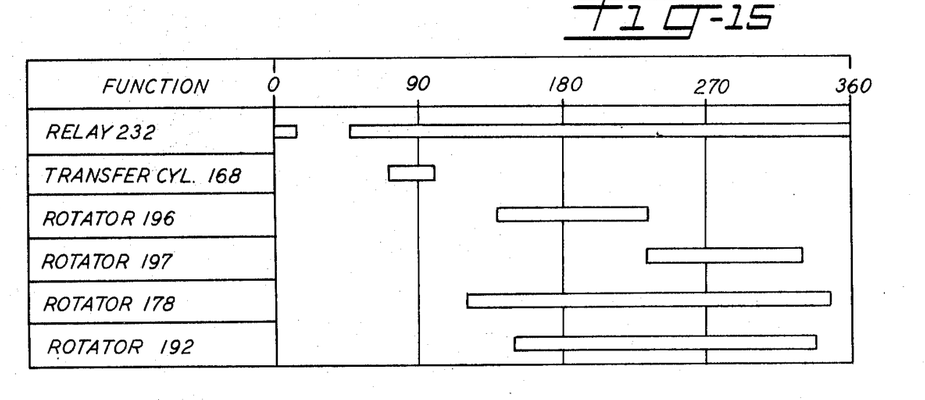
FIG. 15 is a cam timing diagram showing the sequence of operations of selected ones of the several component mechanisms of the unloading apparatus of FIGS. 10 and 11.

The sequence of operation of the various parts of the unloader apparatus of FIGS. 10, 11 and 12 can best be understood by referring to the electrical control circuit diagram of FIG. 13 considered in conjunction with the pneumatic diagram of FIG. 14 and the cam position diagram of FIG. 15.

The initiation and stopping of the unloader 156 is controlled by an on-off switch 208 and the microswitch 163 at the input track 157. All switches are shown in their normal positions before initiation of the unloading cycle. Operating potential is supplied by a 115 V AC source 209 through switch 208. When switch 208 is closed, a solenoid 211 is energized to actuate a valve 212 to supply air to the pneumatic system from an air supply 213.

As the closed fixture 31 emerges from the last testing station and enters input track 157, the moving fixture closes microswitch 163 to energize a motor 214 which drives a plurality of cams 216 to 222 (FIG. 13) which operate a like plurality of associated cam switches 223 and 229. The camming arrangement thus described controls the operation of the transfer air cylinder 168 and the air rotators 178, 196 and 197.

Cam switches 224 and 225 are closed by cams 217 and 218, respectively. Closure of cam switch 224 activates a DC power supply 231 while closure of cam switch 225 sets up a relay 232 through an open microswitch 233. Thereafter cam switch 226 is closed by cam 219 to energize solenoid 176 which actuates valve 174 to operate the air cylinder 168, moving piston 167 and transfer pin 164 into the transfer track 158 to engage and move fixture 31 toward the swing nest 159 to load the fixture 31 into rotatable receiver 177.

As the piston 167 moves toward swing nest 159, the slide 166 closes microswitch 233 to energize relay 232. Energization of relay 232 closes contacts 232a to set up vibrator 192 through cam switch 223 and vibrator control 193, and also closes contacts 232b to establish a relay holding circuit therethrough.

Cam 220 then acts to close cam switch 227 to energize a solenoid 234 which actuates a valve 236 to operate 90° air rotator 178. As rotator 178 is operated, the receiver 177 is rotated through arm 179 and link 181 to align the opening 189 in receiver 177 with passageway 191 and unlatching members 186—186 act on latches 74—74 of fixture 31 to unlatch and open the fixture 31 in the receiver 177.

Shortly after the air rotator 178 is operated, cam 216 closes cam switch 223 to actuate vibrator 192 to aid in freeing the core halves 21 and 22 from the fixture 31.

Between the operation of air rotator 178 and vibrator 192, the cam 221 closes cam switch 228 to energize a solenoid 237 which actuates a value 238 to operate air rotator 196, rotating shaft 198 90° in the counterclockwise direction in relation to FIGS. 10, 11 and 12. As seen in FIG. 11A, the cam slot 204 renders the rotator 198 effective only during its last 45° of rotation wherein the shaft 198 engages pin 206 to pivot swing nest 159 45° counterclockwise at an angle to base 172. At this time, the pin 207 has rotated 45° clockwise in FIG. 11B and now engages the opposite edge of cam slot 205. Thereafter cam 222 closes cam switch 229 to energize a solenoid 239 which actuates a valve 241 to operate air rotator 197. The rotator 197 rotates shaft 199 counterclockwise in FIG. 11B to move pin 207 about axis L—L and thus rotate swing nest 159 90° counterclockwise such that at the end of its movement swing nest 159 is in the opposite 45° orientation as shown by the phantom lines of FIG. 12. By now the core halves 21 and 22 should have been freed from fixture 31 and deposited in discharge chute 161.

Thereafter cam 220 opens cam switch 227, deenergizing solenoid 234 to deactuate valve 236 and operate air rotator 178 90° in the clockwise direction of FIG. 11, rotating arm 179 and link 181 to rotate receiver 177 back into the original position shown in FIGS. 10 and 11.

Finally cam switch 229 is operated by cam 222 to deenergize solenoid 239 and deactuate valve 241 to operate air rotator 197 to rotate shaft 199 90° clockwise according to FIG. 11B. Cam slot 205 renders shaft 199 effective only during the latter 45° of movement thereof to engage pin 207 and rotate swing nest 159 counterclockwise from the phantom position of FIG. 12 to its original upright position.

The fixture 31 within the nest 159 may be removed by an operator or a return conveyor may be provided to receive the fixture 31 which may be pushed out of the receiver 177 by a newly arriving fixture 31. The return conveyor may communicate with the fixture conveyor belt 82 to recycle the empty fixture 31.

What is claimed is:

1. In a test apparatus for separable magnetic cores;
   a fixture for receiving the separated parts of a magnetic core;
   an electromagnetic test facility supported within said fixture and electrically accessible from without said fixture;
   means for inserting the separated parts of the core within said fixture on axially opposite sides of said test facility;
   means for associating said inserted core parts within said fixture to assemble the core in operative relationship with said test facility;
   means without said fixture for providing electrical testing access to said test facility; and
   means for selectively varying the operative relationship of the assembled parts of the core with said test facility to render available a range of test results.

2. A test apparatus for releasably assembling corresponding halves of a hollow article which comprises:
   a contractable means for receiving the corresponding halves of the article in spaced axial alignment;
   a test facility;
   means disposed within said receiving means in the axial space between the article halves for supporting said test facility;
   means flexibly mounted to said receiving means in axial alignment with said test facility for biasing one of the corresponding halves of the article into engagement with said test facility to prevent rotation of the one of the corresponding halves of the article;
   means rotatably mounted to said receiving means in axial alignment with said test facility and said biasing means for engaging and rotating the other half of the article to selectively vary the operative relationship after the article is assembled with said test facility to render available a range of test results;
   means for contracting said receiving means to assemble the article between said biasing means and said engaging and rotating means to enclose said test facility;
   means for releasably retaining said receiving means in said contracted condition to maintain said article in an assembled state; and
   means for releasing said retaining means to permit said contracted receiving means to expand to permit removal of said article halves.

3. A test apparatus as recited in claim 2, wherein said hollow article is a toroidal magnetic core and said test facility includes an inductor coil.

4. A test apparatus for releasably assembling a pair of cup-shaped corresponding halves of a magnetic core, each half having an internal axial projection extending from a circular base comprising:
   contractable means for receiving the corresponding halves of the magnetic core in spaced axial alignment with the projections of each core half facing one another;
   a test coil bobbin disposed within said receiving means, said bobbin having an axis coextensive with the axes of the aligned core halves, for supporting a test coil;
   means for inserting the core halves in said receiving means on axially opposite sides of said test coil bobbin;
   means for contracting said receiving means to assemble the magnetic core halves to enclose said coil bobbin with the projections extending axially therein;
   means for releasably retaining said receiving means in said contracted condition to maintain the magnetic core halves in the assembled state;
   means rotatably supported within said receiving means and frictionally engaging one of said core halves;
   means for driving said rotatably supported means to rotate said engaged core half; and
   means for releasing said retaining means to permit said contracted receiving means to expand to permit removal of said core halves.

5. A test apparatus as defined in claim 4, further comprising:

means disposed within said receiving means and operable when said receiving means is contracted for exerting a predetermined constant axial pressure on said core halves while they are maintained in the assembled state.

6. A test fixture for releasably assembling a pair of cup-shaped halves of a hollow toroidal magnetic inductor core which comprises:

a central block;

a test coil bobbin;

means for supporting said bobbin within said central section;

a first end plate connected to one side of said central block and mounted for movement toward and away from said central block;

a first pad supported within said first end plate and axially aligned with said bobbin;

a second end plate connected to the opposite side of said central block and mounted for movement toward and away from said central block;

a second pad supported within said second end plate and axially aligned with said bobbin and said first pad;

spring means for normally urging said first and second end plates away from said central block to define a first core half receiving compartment between said first pad and said bobbin and a second core half receiving compartment between said second pad and said bobbin;

means for inserting said core halves in the first and second receiving compartments, respectively;

means for moving said end plates toward said central block; and latching means within said central block for retaining said first and second end plates in juxtaposition with said central block when said end plates are moved toward said central block to assemble the core halves between said pads to capture said bobbin.

7. A test fixture as defined in claim 6, wherein:

said first end plate includes a calibrated spring for resiliently urging said first pad toward said second pad with a predetermined force to maintain a constant pressure on said assembled core halves between said pads; and said second pad is mounted for rotation about the axis of said bobbin.

8. A test fixture as defined in claim 7, wherein:

said second pad includes means for frictionally engaging one of said assembled core halves for preventing relative movement between said frictionally engaged core half and said second pad.

9. In a testing apparatus for testing separable halves of a magnetic inductor core;

a closable test fixture for receiving a pair of core halves, said fixture comprising a test coil encloseable by said core halves, a pair of test terminals connected to the coil and means for mounting one core half for rotation with respect to the other core half;

a loading station;

a closing station;

a testing station;

an unloading station;

detecting means at said loading station for detecting the presence of a pair of magnetic inductor core halves therein;

conveyor means responsive to the operation of said detector means for conveying said fixture to said loading station;

means at said loading station for inserting said detected core halves into said fixture and for successively conveying said fixture to said closing station, said testing station and said unloading station;

means at said closing station for closing said fixture to enclose said test coil within said core halves;

means at said test station for making electrical connection to said test terminals of said fixture;

means at said test station for rotating said core half mounting means; and means at said unloading station for opening said fixture to release said core halves.

10. A test apparatus as recited in claim 2, wherein said biasing means is a spring-biased shaft having a pad mounted on the end engaging the one half of the article.

11. A test apparatus as recited in claim 10, wherein said engaging and rotating means is a rotatably mounted shaft accessible from without said receiving means having a friction pad mounted on the end engaging the other half of the article.

12. A test apparatus according to claim 1, further including:

means for disassembling the assembled core to release the separated core parts.